US009274597B1

(12) United States Patent
Karakotsios et al.

(10) Patent No.: US 9,274,597 B1
(45) Date of Patent: Mar. 1, 2016

(54) TRACKING HEAD POSITION FOR RENDERING CONTENT

(75) Inventors: Kenneth M. Karakotsios, San Jose, CA (US); Volodymyr V. Ivanchenko, Mountain View, CA (US); Isaac S. Noble, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 176 days.

(21) Appl. No.: 13/332,172

(22) Filed: Dec. 20, 2011

(51) Int. Cl.
*G06F 3/0346* (2013.01)
*G06F 3/01* (2006.01)

(52) U.S. Cl.
CPC ............... *G06F 3/012* (2013.01); *G06F 3/013* (2013.01); *G06F 3/0346* (2013.01)

(58) Field of Classification Search
CPC ..................................... G06F 3/03; G06F 3/06
USPC .......................................................... 345/158
See application file for complete search history.

(56) References Cited

U.S. PATENT DOCUMENTS

| | | | |
|---|---|---|---|
| 2006/0020898 A1* | 1/2006 | Kim et al. | 715/764 |
| 2006/0119575 A1* | 6/2006 | Richardson et al. | 345/156 |
| 2006/0256133 A1* | 11/2006 | Rosenberg | 345/619 |
| 2008/0273755 A1* | 11/2008 | Hildreth | 382/103 |
| 2009/0051699 A1* | 2/2009 | Posa et al. | 345/619 |
| 2009/0315915 A1* | 12/2009 | Dunn et al. | 345/632 |
| 2010/0125816 A1* | 5/2010 | Bezos | 715/863 |
| 2010/0238344 A1* | 9/2010 | Tsai | 348/361 |
| 2011/0090149 A1* | 4/2011 | Larsen et al. | 345/158 |
| 2011/0261211 A1* | 10/2011 | Lee et al. | 348/211.4 |
| 2011/0298936 A1* | 12/2011 | Watanabe et al. | 348/208.4 |
| 2012/0038627 A1* | 2/2012 | Sung et al. | 345/419 |
| 2012/0314899 A1* | 12/2012 | Cohen et al. | 382/103 |

\* cited by examiner

*Primary Examiner* — Kent Chang
*Assistant Examiner* — Sujit Shah
(74) *Attorney, Agent, or Firm* — Novak Druce Connolly Bove + Quigg LLP

(57) ABSTRACT

Content displayed on a display element of a computing device can be rendered from a viewpoint that updates with changes in the relative position of a user's head, or other such feature, with respect to the device. At least one camera of the device can attempt to track the relative position in order to determine the proper viewpoint. When the user's head can no longer be seen, or when confidence in the determined relative position drops below an acceptable value, for example, the device can utilize information from another source, such as a motion or rotation sensor, to attempt to estimate the current position of the user's head. Physical limitations of the user with respect to the device also can be used to improve the accuracy of the determination.

19 Claims, 8 Drawing Sheets

TRACKING HEAD POSITION FOR
RENDERING CONTENT

BACKGROUND

As people are utilizing computing devices for an increasing variety of tasks, there is a corresponding desire to increase the ways in which users can interact with these devices. Certain computing devices enable a user to provide input using relative position or motion, such as by making a motion or gesture with respect to a camera of the computing device. In order to provide such input for a conventional approach, however, the appropriate portion of the user must be within the field of view of a camera of the device. Conventional front-facing cameras on a device are relatively high resolution but have a limited field of view. Accordingly, an amount of relative movement between the user and a device can cause the user to quickly move out of the field of view. When the user is out of the field of view, the relative position of the user cannot be determined and appropriate input cannot be provided.

BRIEF DESCRIPTION OF THE DRAWINGS

Various embodiments in accordance with the present disclosure will be described with reference to the drawings, in which.

DETAILED DESCRIPTION

Figure 1A:
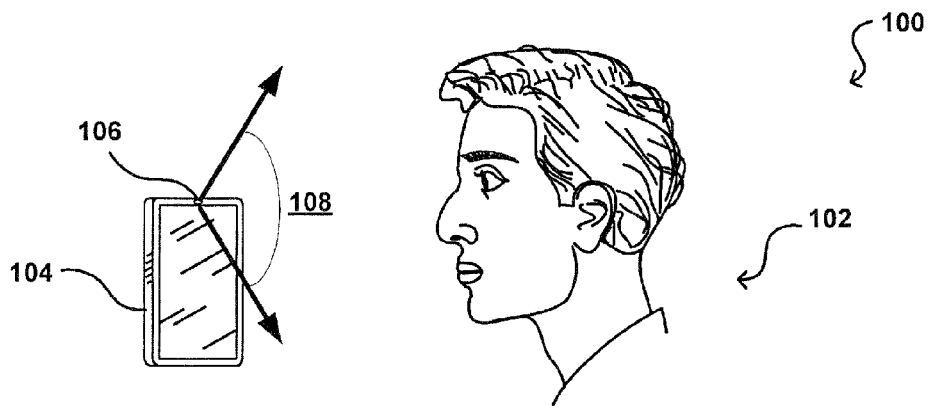
FIGS. 1(a), (b), (c), and (d) illustrate an example situation wherein a computing device is configured to provide different views of information based at least in part upon a relative position of a user's head in accordance with various embodiments.

Systems and methods in accordance with various embodiments of the present disclosure may overcome one or more of the aforementioned and other deficiencies experienced in conventional approaches to providing input to a computing device, as well as approaches to rendering content on a computing device. In particular, approaches discussed herein enable a computing device to track the relative position of a user with respect to the device, even when the user is outside a field of view of a camera or other such sensor of the device. For devices that render content based at least in part upon a current viewpoint or perspective of the user, based at least in part upon the determined relative position of the user's head, such approaches enable content to be rendered with the appropriate perspective even when the user's head is not within the field of view of an active camera element or other such component. In some embodiments, the content can be rendered with a three-dimensional (3D) effect in the proper perspective over a wide range of viewing angles or perspectives, throughout which the user will have a clear view of the display.

In some embodiments, one or more cameras are used to track the relative head position of a user in order to assist in generating a perspective-appropriate "three-dimensional" image on a display screen of the device. Changes in the relative position of the user's head can result from motion of the user or the device, or a combination of both. One or more sensors such as an electronic gyroscope or accelerometer can be used to track motion of the device. When the user moves out of the field of view of a camera that is tracking the head position, the sensors can provide information about the movement of the device to enable estimation of the current position of the user's head with respect to the device, as may be due to a rotation, tilting, or translation of the device.

In some embodiments, a device can instead (or additionally) monitor the captured image information to attempt to determine motion through changes in position of objects in the background. For example, a rotation or translation of the device can be determined by monitoring changes of the position of background objects captured in images captured at different points in time. Such information can also help to determine the relative position of the user's head during or after the motion, which may not be able to be obtained by relying only on a sensor such as a gyroscope. For example, the user might rotate the user's entire body, instead of just the device, which might cause the user's head to be in approximately the same relative position with respect to the device, even though the device underwent a significant amount of motion.

In some embodiments, a device can utilize the relative position of one or more light sources to attempt to determine device motion. For example, when the device is outside on a sunny day the device might be able to use a shadow sensor or other such element to determine the relative position of the sun. By tracking that relative position over time, the device can determine changes in orientation of the device.

A prediction algorithm used to estimate relative head position based on sensor data or other such information can also take into account various limitations of the human body when predicting the relative position of a user's head with respect to a device. For example, if a user is leaning all the way to the right and the user then disappears from the field of view, it can be assumed that the device was rotated (unless the user got up or performed another such motion) as the user is already leaning as far as the user is able to lean. Similarly, if the user tilts his or her head as far as it can go, it can be assumed that any additional motion causing the user to move out of the field of view of the camera is a result of motion of the device.

In at least some embodiments, a device can utilize two or more of these approaches to attempt to track the relative position of a user to a computing device. In some embodiments, at least one imaging approach can be utilized with at least one motion determining approach. For example, a video capture and analysis process can be used with an electronic gyroscope and accelerometer-based motion determination approach, or can be used with a background object or light source tracking process. In some embodiments the approaches used at any given time can depend on one or more environmental factors, such as an amount of ambient light, the presence of point light sources nearby, and other such factors.

Various other applications, processes and uses are presented below with respect to the various embodiments.

As mentioned, various user interfaces generated on a computing device can accept input and/or provide output based at least in part upon a relative position and/or relative motion of a user or object with respect to the device. For example, FIG. 1(a) illustrates an example situation 100 wherein a camera 106 of a computing device 104 is able to capture image information regarding objects within a field of view 108 of that camera. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, video gaming consoles or controllers, and portable media players, among others. The computing device 104 can include one or more cameras or other such capture elements operable to perform functions such as image and/or video capture, positioned at any appropriate location on the device. Each image capture element may be, for example, a camera, a charge-coupled device (CCD), a motion detection sensor, or an infrared sensor, or can utilize another appropriate image capturing technology.

In FIG. 1(a), the head of a user 102 is positioned within the field of view 108 of the camera 106, such that the computing device can determine that the viewing perspective of the user with respect to the device is substantially "straight on," whereby a vector between the user's eye position and a display screen of the device would be substantially orthogonal to the plane of the display screen. From such a determined perspective, the device might render content with a "typical" or "normal" point of view 142, such as is illustrated on the device 140 of FIG. 1(c). In this example, the user is able to see a selection of categories displayed to appear substantially parallel to the plane of the display screen.

In this example, the user can control the way in which the category information is displayed by tilting the device in order to cause the rendering of categories on the screen to "rotate," such that the categories appear to be hanging from a rod or otherwise able to rotate with a rotation or tilting of the device. FIG. 1(d) illustrates an example of such a rotation, where the categories 162 displayed on the device that has been tilted backward have "rotated" as well, such that the user is able to view more information on one or more of the category pages or panels. It should be understood that there are many ways of presenting information and content that mimics three-dimensional movement, and that any of these ways can be used as well with various embodiments.

Figure 1B:
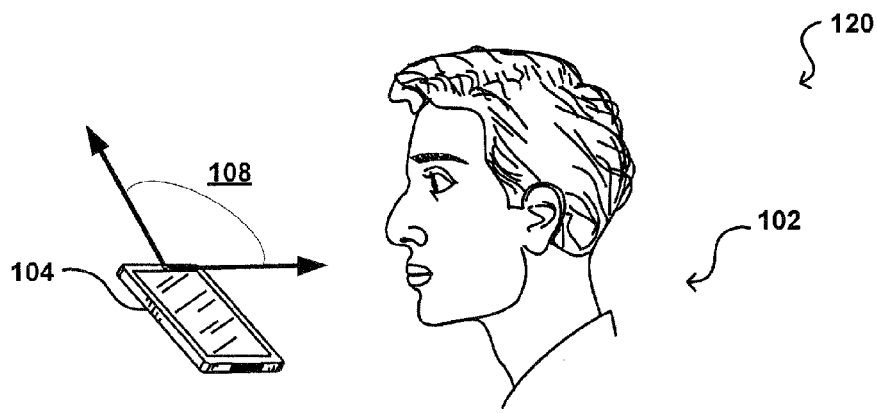
Figure 1C:
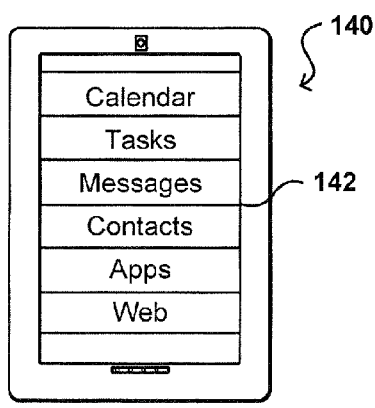
Figure 1D:
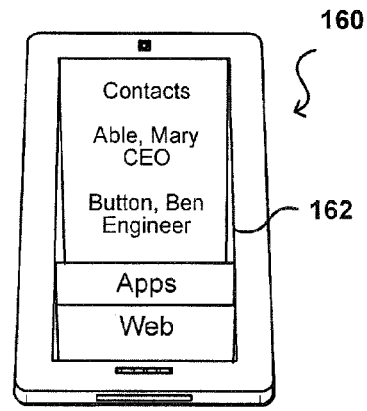

FIG. 1(b) illustrates a view of the environment 120 where the device 104 has been tilted backward with respect to the user 102. It should be understood that a similar relative orientation between the user and device could result from the user moving with respect to the device as well. In this example, the user 102 is still within the field of view 108 of the camera, such that the device 104 can determine the relative orientation of the user's head, and thus the perspective of the user. In some embodiments, the device could alternatively attempt to track the user's eye or gaze position, or other aspects such as head tilt or pose, to attempt to provide more accurate perspective rendering, although for many applications head tracking can be sufficient. For example, certain embodiments might locate the head and assume that the head is facing the device, while other embodiments can attempt to improve accuracy of perspective determinations by determining a pose or relative orientation of the head of the user, as discussed in more detail later herein.

Figure 2A:
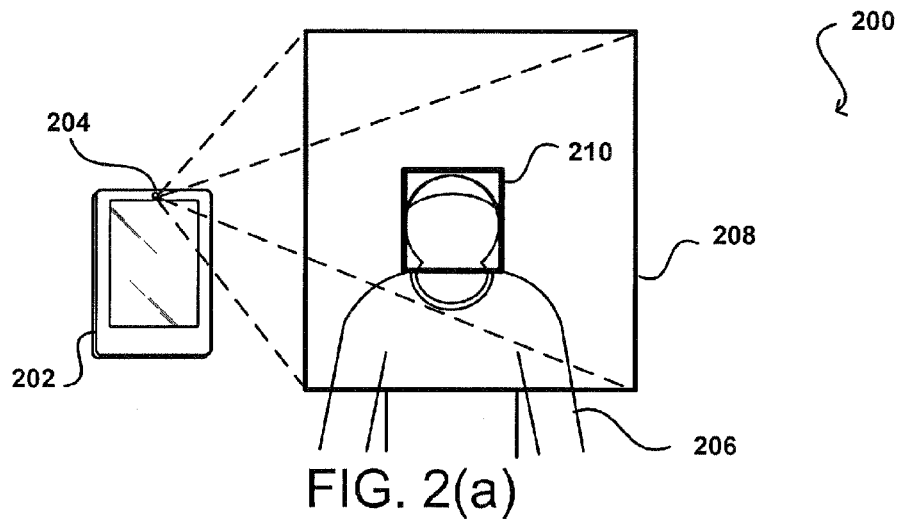
FIGS. 2(a), (b), (c), (d), and 2(e) illustrate example situations where different relative motions between a device and a user can be determined or estimated in accordance with various embodiments.

FIG. 2(a) illustrates an example situation 200 wherein a user 206 is positioned within the field of view 208 of a camera 204 of a computing device 202. In some embodiments, the camera 204 can be a video capture element capable of capturing a substantially continuous stream of image information, at least over a specified period of time. Since it can be very resource intensive to process the entire video stream using facial detection algorithms or other such processes, various approaches can instead utilize a less robust algorithm, such as a pattern matching algorithm, to attempt to identify the presence of a person's head or other such feature in the image stream. For example, in FIG. 2(a) a pattern matching algorithm can look for a contour or shape that matches the shape of a human head within a specified level or range of certainty. Upon detecting such a shape or contour, the device can track a relative position or area 210 in the captured image information corresponding to the user's head. Approaches for detecting and tracking shapes or contours are known in the art and as such will not be discussed herein in detail. In at least some embodiments, the detection of a user's head can cause at least one perspective determining process to be activated, or can at least trigger a portion of a relative position determining process. In some embodiments, a computing device can have at least one infrared (IR) emitter and receiver, or at least one IR transceiver, operable to transmit IR radiation and detect IR reflected back from one or more objects within a field of view of the IR receiver. As known in the art, the human eye reflects IR radiation differently than the rest of the human head, such that the presence and/or position of a user's eyes can quickly be detected and/or located by analyzing a captured IR image. Such information can help determine the presence of a user's head without requiring significant image processing, and can also help improve the perspective determinations in at least some embodiments.

Figures 2B, 2C:
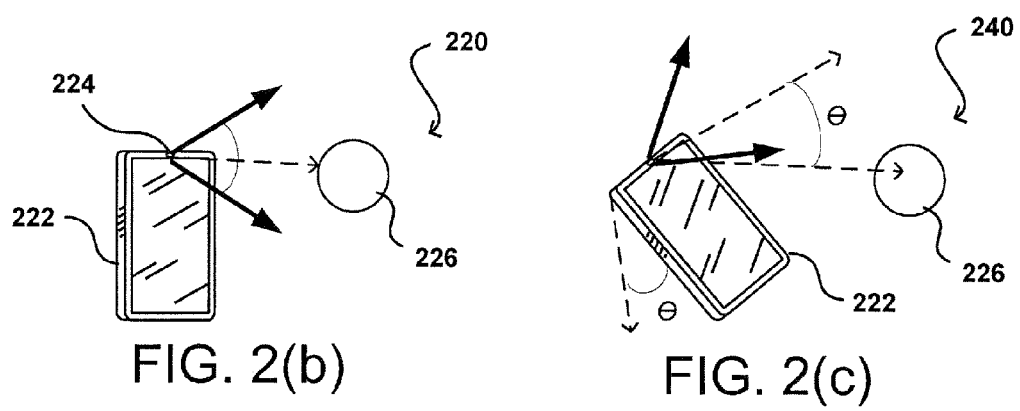

Using such an approach, the relative position of the user's head 226 with respect to the computing device 222 can be tracked as long as the head is within the field of view of an appropriate camera 224 of the device, as illustrated in the situation 220 of FIG. 2(b). It might be the case, however, that the relative position might change such that the user's head is no longer within the field of view, as illustrated in the situation 240 of FIG. 2(c). In this example, the device has been rotated by an angle θ, which has caused the user's head to move outside the field of view.

In at least some embodiments, however, the computing device can include at least one rotation-determining element, such as an electronic gyroscope or electronic compass, that is able to determine the amount of rotation of the device. In this example, a gyroscope might be able to determine that the device rotated by an amount θ since the user's head was last detected in the field of view. Accordingly, the device can estimate that the relative position of the user's head to the device has also shifted by a similar amount. Thus, even though the device is unable to view the user's head, the device can render content on the display screen based on where the device estimates the user to be, based at least in part upon the determined motion of the device.

In many cases, however, the device will not be rotated about an axis that passes through the camera, such that there will be at least some translation in addition to the rotation.

Further, if a user is holding the device and moves the device with his or her arms, there will be some translation due to the pivot point of the elbow or shoulder being a distance from the device. Other sources or causes of device translation can exist as well. Accordingly, it can be desirable in at least some embodiments to measure and track translation in addition to rotation, using a component such as an accelerometer or inertial sensor.

Figures 2D, 2E:
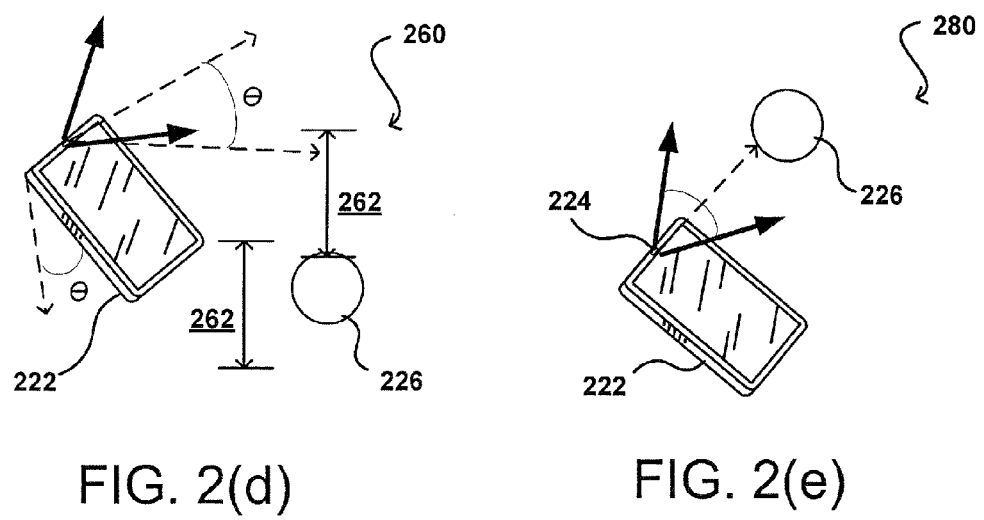

For example, FIG. 2(d) illustrates a situation 260 wherein a computing device has undergone a translation of a given distance 262 in addition to the rotation of amount θ. As can be seen, only monitoring the rotation or the translation would be insufficient to determine the proper relative orientation of the user 226 with respect to the device 222. By combining the rotation and translation information together, however, the device can make a relatively accurate prediction of the current relative position of the user's head. As discussed later herein, other information can be utilized as well. For example, a device might include a touch sensitive material or other component enabling the device to determine that it is being held or at least contacted by the user. Accordingly, the device can determine that it is within an "arm's length" of the user's head. Thus, if the amount of translation is more than the approximate maximum length from the user's hand to the user's head, the device can determine that the user is walking or otherwise moving with the device, and can use this distance limit to better predict the current relative position of the user's head.

Similarly, relying only on translation and rotation information can be insufficient as well. In the example situation 280 of FIG. 2(e), the user has rotated and/or translated with the device, such as where the user rotates in a chair while holding the device or makes another such motion. In such a situation, the device and user have both changed position and/or orientation, but in this example the relative orientation and position of the user with respect to the device has remained consistent, such that no change in rendering perspective is needed or appropriate. Thus, it can be seen that it can be important in at least some embodiments to utilize two or more types of approaches to determining relative user position or perspective in order to accommodate the various potential situations, such as may include image-based position determination approaches and inertial approaches, as may be determined using an electronic gyroscope and accelerometer, or the like.

As mentioned, it also can be helpful to consider physical limitations when using sensor data or other information to predict relative position. As discussed, if a user is detected to be holding or otherwise contacting a device, it can be advantageous to utilize that information to limit the distance (and potentially the orientation) of the predicted relative position of the user with respect to the device. Various other physical limitations can be utilized as well within the scope of the various embodiments.

Figure 3A:
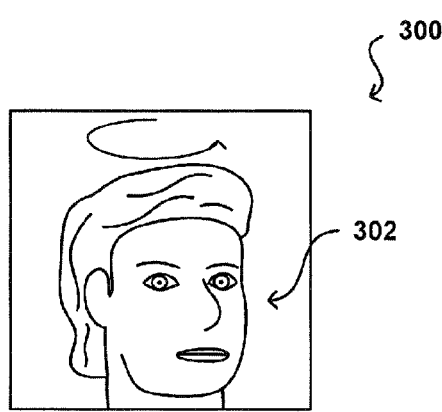
FIGS. 3(a), (b), (c), and (d) illustrate example situations where motion can be inferred due to limitations of human movement in accordance with various embodiments.
Figure 3B:
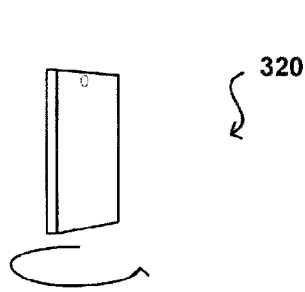
Figure 3C:
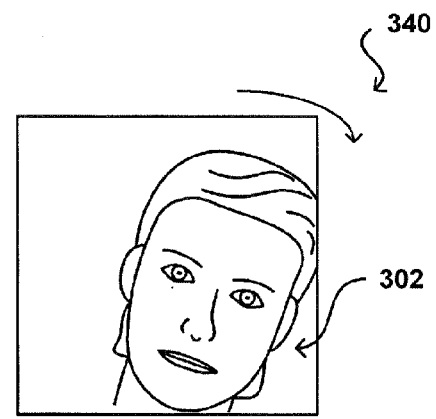
Figure 3D:
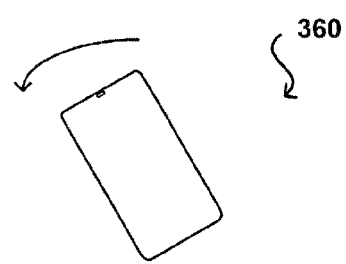

For example, FIG. 3(a) illustrates an example situation where an image 300 captured of a user shows that the user has rotated his head 302 by an amount that is almost at the extent of the possible rotation range. For example, a user with his or her shoulders facing the device might be able to rotate his or her head by a range of about +/−85 degrees from normal with respect to the device. If the user's head is seen to rotate more than that amount, it can be determined that the device is being rotated and/or translated in a way that causes that orientation to appear in the image, as illustrated in the example situation 320 of FIG. 3(b). Similarly, FIG. 3(c) illustrates an example situation 340 wherein a user is seen to be tilting his head 302 by a maximum amount, such as may be on the order of about +/−45 degrees from normal for some users. The amount of movement will vary between users, and it should be understood that the amounts used by the device can be general ranges or values, or can be learned or customized for specific users. In such an instance the pose of the user's head can be determined in addition to the relative position. If the user's head is seen to tilt more than the maximum amount with respect to the user's shoulders, it can be determined that the device is being tilted as well, such as illustrated in the example situation 360 of FIG. 3(d).

Other limitations can be considered as well within the scope of the various embodiments. For example, a user can only bend his or her arm by a certain amount, or otherwise move in certain ranges while holding a device. In some embodiments, a maximum head position range can be determined when any part of the user can be seen by a camera of the device. For example, the device being able to capture information about a foot, elbow, or other such feature of a user can be used to determine a maximum distance of the user's head, and in some cases the orientation of that feature can be used to determine an approximate range of relative position based on the skeletal kinematics or physical limitations of human movement. Also, a wrist or elbow can only make certain types of motion, such that if the relative position is spinning a certain direction or range it can be determined that the device is being moved if such a movement would not be possible by the human body. Further, certain motions such as wrist rotations can be very fast in terms of degrees, while whole body rotations can be much slower, whereby speeds of movement or rotation can also be used to infer a type of motion. Various other such information can be used as well within the scope of the various embodiments.

Figure 4A:
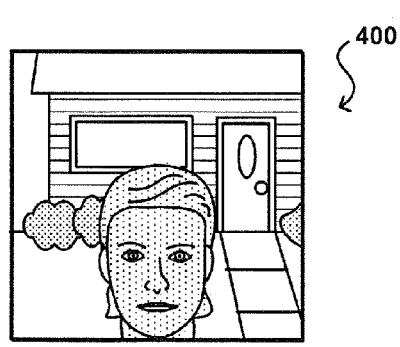
FIGS. 4(a) and (b) illustrate example images that can be captured and analyzed in accordance with various embodiments.
Figure 4B:
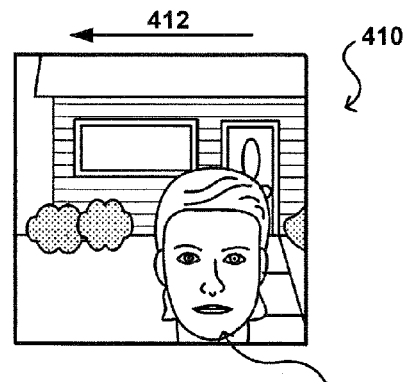

In some embodiments, it can be desirable to reduce the amount of resources needed to locate the head of the user in the captured image information. FIGS. 4(a) and 4(b) illustrate an example approach that can assist with the location process. In FIG. 4(a), an image 400 can be captured with ambient light (or another such light source) illuminating the face of the user. In FIG. 4(b), the image 410 is captured while the user's head is being illuminated with a light source of the device, such as a white light LED, IR emitter, or other such source. Since the illumination will cause a more drastic change in foreground objects than background objects, such an approach can be used to more quickly separate out the foreground objects, which can reduce the amount of the image to be analyzed for head position determination. A potential issue with such an approach, however, is that the images may be captured at different times to reflect the different lighting conditions, such that movement of an object such as the user's head may occur between image captures. As illustrated in FIG. 4(b), the user's head position is substantially different than in FIG. 4(a), such that a standard image subtraction or similar approach will not work to subtract out just the background object. The change in position of the foreground object (e.g., the user's head) can reduce the advantage of the use of light to separate out foreground objects as the images must still be analyzed using feature recognition or another such process to correlate the positions of various foreground objects.

As discussed, the motion of a camera or other such imaging element can include a translation and a rotation component, in one, two, or three dimensions. Even small rotations of a camera can potentially result in significant movement of objects in the captured images. The amount of movement can depend upon the angular capture range, or viewable angle, of the camera, as well as the speed of the rotation. Because all objects in the image will move by the same angular amount upon a rotation, however, the background will move "with" the objects in the foreground in the image information. It should be noted, however, that translation tends not to affect the background to the same extent between images. For example, the image 400 of FIG. 4(a) was captured at a first position and the image 410 of FIG. 4(b) was captured at a second position, resulting from a lateral translation as indicated by the directional arrow 412. Due at least in part to the distance to the background objects, which for small consumer optical components can be considered to be almost at infinity for calculation purposes, there will be very little lateral shift in position of the background objects between pictures. Objects in the foreground, such as the user's head 414, however, can move by a more appreciable amount. Thus, comparing the images 400, 410 can assist with the separation of the background (e.g., by image subtraction) as the small change in lateral position of the background can enable the background to be identified during a comparison process. As an additional benefit, however, the device can determine that the device shifted laterally by an amount corresponding to the movement of the head and the background between images. In such situations, being able to determine the relative distance to the user can be used with the amount of translation to determine an amount (and direction) of translation of the device.

Figure 5A:
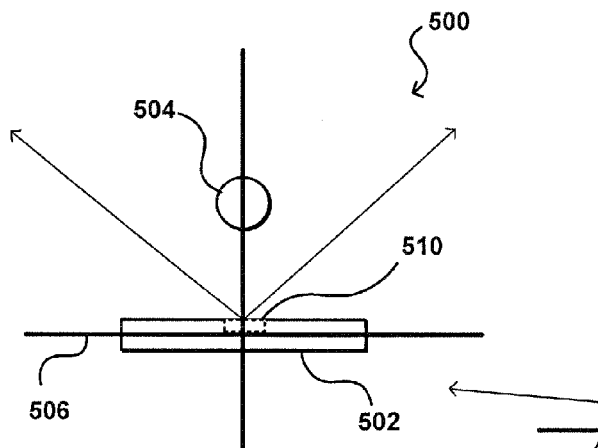
FIGS. 5(a), (b), and (c) illustrate an example process for determining motion of a device between image captures that can be utilized in accordance with various embodiments.

A similar approach can be used to determine an amount of rotation of the device based at least in part upon the movement of objects in a background. As discussed, rotations will cause the head to move with the background, while translations will cause the head to move more than the background in the images. As an example, FIG. 5(a) illustrates a "top view" 500 of a computing device 502 operable to capture an image of an object 504 within an angular view 508 of a camera of the computing device. In this example, the computing device 502 can include at least one orientation- or rotation-determining element, such as an electronic compass or electronic gyroscope, that is able to determine a frame of reference 506 in two or three dimensions with respect to a first orientation of the device. In at least some embodiments, an electronic compass might be used to determine an axis of the frame of reference 506, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 506 or orientation can be determined at or near the time of capture of a first image by a camera 510 of the computing device 502. In some embodiments, the determination can be triggered by receiving input to capture an image or another such action, but in other embodiments the frame of reference and/or orientation information can be updated periodically, such as several times a second based upon the type and/or configuration of the electronic gyroscope, inertial sensor, or other such movement or orientation sensor. A gyroscope, for example, can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 5B:
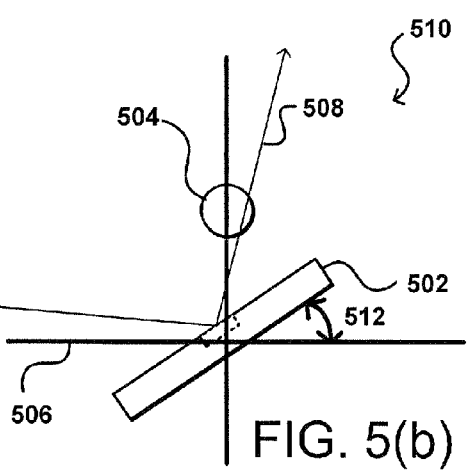

FIG. 5(b) illustrates a second top view 510 after a change in orientation of the computing device 502. The electronic gyroscope (or other such component or embedded sensor) can detect the change in orientation, in this example corresponding to a change in angle 512 with respect to the frame of reference in the plane of the figure. The gyroscope can present information about the change in orientation in any appropriate form, such as in angles or radians of change for one, two, or three axes (e.g., $\Delta x$, $\Delta y$, $\Delta z$), percentage changes in pitch, roll, and yaw, etc. In this example, the change in orientation is determined to be a given angular amount of rotation 512 about a single axis. As illustrated, this causes the object 504 to be moved to the right edge of the field of view 508 of the camera 510. In at least some embodiments, the gyroscope will not be accurate enough to provide an exact amount of rotation, but can provide an approximation or estimate of the amount of rotation that can be used to narrow the search space and facilitate the location of corresponding objects in the images.

Figure 5C:
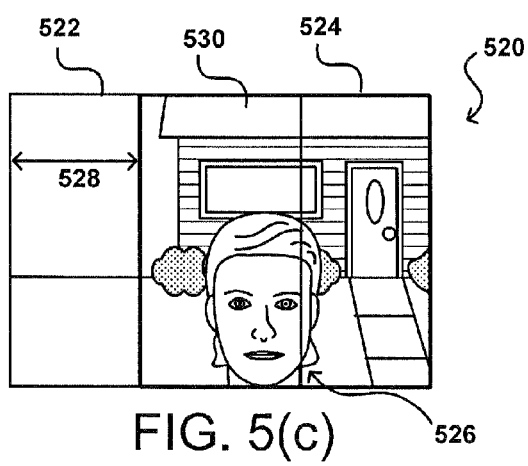

As mentioned above, information such as the angular capture range of the camera and the amount of detected shift 528 between images, as illustrated in the example of FIG. 5(c), can be used to determine an amount of angular rotation of the device and predict the current relative position of the user. For example, the angular capture range or field of view 508 of the camera 510 in FIG. 5(b) might be 120 degrees, and based on the amount of shift 528 of the head in the images it can be determined that the angular rotation amount was about 40 degrees, or about one third of the total angular view. FIG. 5(c) illustrates an example overlay 520 of a first image 522 captured at a first orientation of the computing device and a second image 524 captured at a second orientation of the computing device. Once an amount of lateral shift in object location between the images is determined, that amount of lateral shift or offset 528 can be used to align the images 522, 524 such that objects 530 in the background will substantially align and/or can be used to determine the amount of device rotation. In embodiments where facial recognition or head tracking processes benefit from foreground separation, for example, the aligned background objects can be removed through a comparison process such that one or more objects 526 in the foreground can be more easily detected and analyzed, as discussed elsewhere herein.

As discussed, a device can also utilize the relative position of one or more light sources near the device to determine a direction and/or amount of device movement. In some embodiments, a device is able to use at least one camera to determine the approximate location or projection direction of a primary light source, such as by performing image analysis on at least one captured image. In order to improve the accuracy of the determination, the device can utilize at least a second camera and also determine the relative location/position of the light source from a second position. By combining the position/location of the light source as determined by the first and second camera, the device can determine a three-dimensional location of the light source. As discussed elsewhere herein, the ability to determine a position of a light source relative to the device in three dimensions enables the amount of movement of a device to be determined by determining changes in the relative position of the light source.

There can be various problems or disadvantages, however, to attempting to determine light position using standard image analysis. For example, a sensor might be oversaturated when capturing an image that includes the light source, which prevents the sensor from capturing an accurate image. Further, the captured image might show multiple white regions, only one of which corresponds to an actual light source, and it can be difficult for the device to distinguish between, or properly interpret, those regions. Further, a light source that illuminates a device and/or imaged object might not actually be captured in the field of view of a camera at the current orientation. As described herein, various embodiments overcome these identified problems and disadvantages.

In at least some embodiments, various sensors and/or sensor assemblies can be used to determine the approximate direction and/or location of one or more light sources around a device. A sensor can capture light using, for example, an array of pixels, and can capture intensity, color and/or other such aspects of visible light or other radiation (e.g., infrared radiation) incident on, or otherwise directed to, the sensor. In one embodiment, the sensor can be positioned relative to a lens element, which can be a focusing lens, glass plate, transparent plastic disc or other such element capable of transmitting light while protecting the sensor from scratches, debris, or other potential damage by being otherwise exposed. As mentioned above, an electronic device can have one or more such sensors that are each capable of capturing light from at least one direction, or range of directions, around the device. The sensor could be, for example, a portion of the camera 106 illustrated in FIG. 1(a). Examples of such sensors can be found, for example, in co-pending U.S. patent application Ser. No. 13/107,710, filed May 13, 2011, and entitled "Realistic Image Lighting and Shading," which is hereby incorporated herein by reference.

Figure 6A:
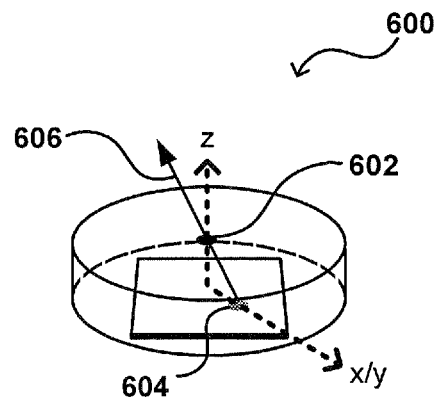
FIGS. 6(a) and (b) illustrate an example approach to determining device motion based at least in part upon motion of a shadow from a light source that can be utilized in accordance with various embodiments.
Figure 6B:
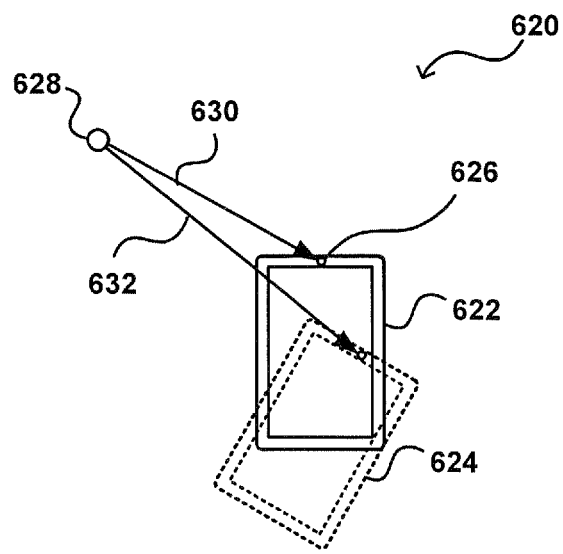

As mentioned, it can be desirable in at least some embodiments to utilize an occlusion that gives three-dimensional information regarding a position of a light source. As illustrated in the situation 600 of FIG. 6(a), knowing only the difference in position of the shadow on the sensor from a neutral position (e.g., for incident light orthogonal to the sensor that casts a shadow in the center of the sensor) can give only directional information in a plane, such as along the x/y vector for the position of the shadow 604. A similar result would be obtained from an elongated member when the end of the occlusion is not able to be determined from the shadow. In order to get three-dimensional information, a distance along an orthogonal direction (e.g., z in the figure) between the sensor and the occlusion 602 can be used to determine the relative projection direction of the light source. In one example, a centroid of the shadow 604 on the sensor is calculated and compared with a known center position of the occlusion 602. By calculating a vector passing through both the centroid and the occlusion center point, the direction to the light source can be determined in three dimensions. Such an approach can be useful when determining translation and rotation of the device, as the distance from the light source can be used in addition to the direction. For example, FIG. 6(b) illustrates an example situation 620 wherein the device has been rotated. By determining the length of the vector 630 between the point source 628 and the camera 626 of the device in the first position 622 and the vector 632 between the point source and the second position, in addition to the difference in direction, the device can determine a more precise movement of the device (and not just a rotation, etc.). Since the user will not generally be in the same direction of the light source, this difference in distance can potentially significantly affect the user perspective for certain movements.

Figure 7:
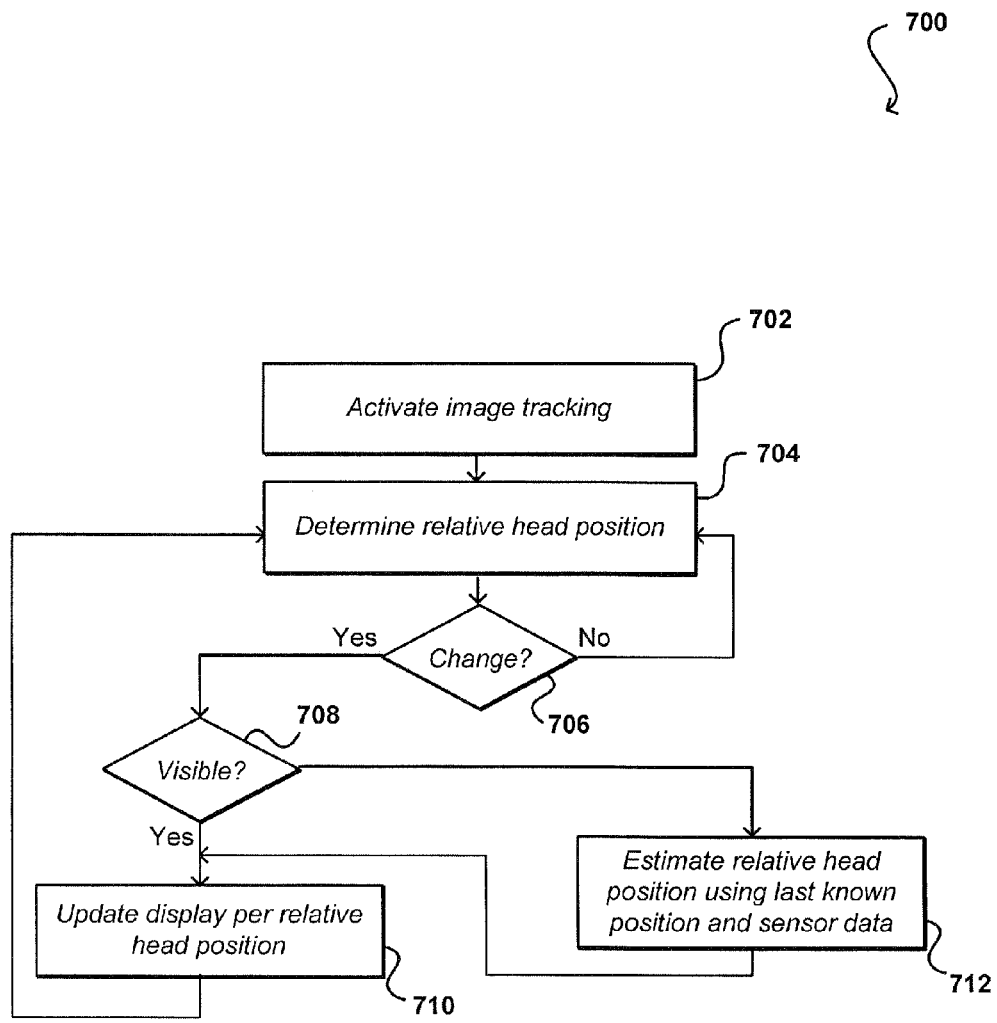
FIG. 7 illustrates an example process for tracking the relative position of a user's head with respect to a device that can be utilized in accordance with various embodiments.

FIG. 7 illustrates an example process 700 for updating a display of rendered content based on the relative position of a user that can be used in accordance with various embodiments. It should be understood that, for any process discussed herein, there can be additional, fewer, or alternative steps performed in similar or alternative orders, or in parallel, within the scope of the various embodiments unless otherwise stated. In this example, image tracking is activated 702 on a computing device. In addition, one or more sensors can be activated to determine and track information relating to changes in position and/or orientation of the device in at least some embodiments. In embodiments where the sensors remain active, the sensor data can be buffered or otherwise utilized for perspective or other such determinations. During image tracking, a relative position of the head, face, eyes, or other portion or feature of a user can be determined 704 in order to enable perspective-dependent display or other such functionality. In at least some embodiments, content rendered on a display element of a device can be rendered in a default (i.e., "normal") orientation until the location of a user's head or other such feature can be determined, whereby the perspective or line of sight of the user can be determined.

Once the user's head is located, the relative position can be determined with respect to the device and tracked over time. In some embodiments, the initial position can be determined with respect to a default position. The determination of relative position can occur at any appropriate frequency, as may be based at least in part upon a capture rate of the device camera. For each relative position determination, the device can determine whether the relative position has changed 706 at least a threshold amount from the previous relative position. For example, a device might not re-render an image if the relative position of the user changes less than one or two degrees, or the distance to the user changes by less than five percent, or another such threshold or criterion. If the relative position has not changed by at least such an amount, the device can continue to track the relative position and render the content displayed using the current perspective.

If the relative position has changed by at least the determined amount, the device can determine whether the head (or other tracked feature) is still visible 708 to the device, such as where the user's head is still within the field of view of at least one camera on the device. In some cases, the fact that the head can no longer be seen can be indicative of an amount of movement greater than the minimum threshold amount. If the head is still visible in the captured image information, the content displayed on the screen can be updated 710 to correspond to the perspective of the user at the determined position. If the head is no longer visible to the device, the device can estimate 712 the current relative head position with respect to the device using the last known relative head position and sensor data (or other such information) from the time of the last known head position. For example, the device can determine an amount of rotation and/or translation of the device using accelerometer data and gyroscope data, background image information, or other such data, and use that amount to estimate the current relative position of the user's head. In some embodiments, the device can track the relative motion of the user's head with respect to the device to determine when the head is likely to move out of the field of view, and can use that information to pull data from the buffer, start predicting location, or performing other such functionality. As discussed, the determination can also take into account other types of information as well, such as physical limitations of the user's body, etc. Further, if the device is at a very oblique angle with respect to the user, it can be assumed that the device is likely being tilted with respect to the user instead of the user making a large movement around the position of the device. Other such information or assumptions can be utilized as well. The device then can proceed to update the display using the current perspective of the user based at least in part upon the estimated relative position.

In some embodiments, a tracking algorithm executing on the device (or at least in communication with the device) can analyze sensor information when a user's head starts disappearing, for example, in order to attempt to determine why the head is disappearing. If the sensor data indicates that the device is not moving or rotating, for example, that information can be used to infer that the user is leaving. In such a situation, the device might not do any processing or updating of perspective, etc. If, instead, a strong gyroscope signal or other such input is obtained indicating a significant amount of device motion, which implies that the user is tilting the phone, the device can utilize an approach to attempt to render the images using an appropriate perspective. As mentioned, in some embodiments changes in perspective are only rendered up to a certain angle of perspective, as beyond that angle very little of the screen can be seen anyway. Any time the head is not seen in the image information there can be a basic assumption that the head will not move significantly, such that the rendering perspective will be relatively accurate based at least upon device movement or other such information. While such assumptions can provide a source of potential error, in general users can be more likely to tilt a device than significantly move or tilt the user's head to view content on the device, such that the error in many cases can be of an acceptable range. In many cases, a user at least will be less likely to move his or her head significantly while also moving the device. Various other assumptions can be relied upon as well in various prediction algorithms.

As mentioned, a device can utilize at least two perspective determinations in at least some embodiments to improve the accuracy of those determinations. As the user's head position begins to fall outside the field of view of the device, or when the relative position can no longer be determined with an acceptable degree of confidence using a visual detection approach, a weighting of an inertial- or sensor-based method can be increased that is able to at least accurately determine the motion of the device. As discussed, once the head position can no longer be captured by a camera of the device then a determination algorithm might have to assume that the head is remaining substantially stationary, is following a previous trajectory or type of motion, etc. If the device was not moving but the head is no longer visible, the device might not attempt to update the rendering of content until the head position can again be determined with a level of accuracy, at which point the perspective can be updated as appropriate. In at least some embodiments head tracking will stop when the user walks away in order to conserve resources, and the tracking might not start again until a certain event occurs, such as the user picking up the device, motion being detected near the device, etc. When the user's head is again within the field of view, the device can update the perspective rendering information accordingly. If the estimates of relative position were off such that there needs to be a substantial updating of the rendering, the device can relatively slowly update the rendering instead of causing the image information to jerk, jump, or otherwise rapidly change to the proper perspective, which might negatively impact the user experience.

Various other types of information can be used to improve the accuracy of perspective determinations within the scope of the various embodiments. For example, a device can utilize audio beamforming to attempt to track the relative orientation of a device with respect to a source of sound, somewhat similar in nature to the light source approach discussed above. Any shift in the relative position of a source of noise, ambient or other, can be indicative of movement of the device. Other information can be used as well, such as detection of the user holding, contacting, or squeezing the device, making a motion or gesture within a field of view of the device, or performing another such action that is indicative of the user being near the device and/or within a specific area with respect to the device.

When using a sensor such as a gyroscope to determine motion, the gyroscope signal can be sampled much faster than the video or image capture frame rate. In some embodiments, an element such as a Kalman filter can be used to synchronize, extrapolate, and subtract the predicted rotational signal from the optical flow between successive frames. Such an approach can utilize control over different levels of operating system software, as well as hardware components, to minimize delays and predict changes in synchronization with high accuracy.

In at least some embodiments, a component such as an electronic gyroscope can provide a velocity of rotation about three axes. When the velocity is compared against the amount of elapsed time, an amount of rotation can be determined. Thus, in at least some embodiments each gyroscope reading has an associated timestamp. With a relatively high frequency of determination, a rotation angle for a period of time can be determined with relative accuracy. The rotation angle can be thought of as the optical flow, which as illustrated does not depend largely on distance to a particular object as everything is expressed in degrees of rotation. Knowing the field of view of the camera enables conversion between pixels and degrees (i.e., a camera of 100 pixels with a 50 degree field of view will have a 0.5 degree per pixel value).

Figure 8:
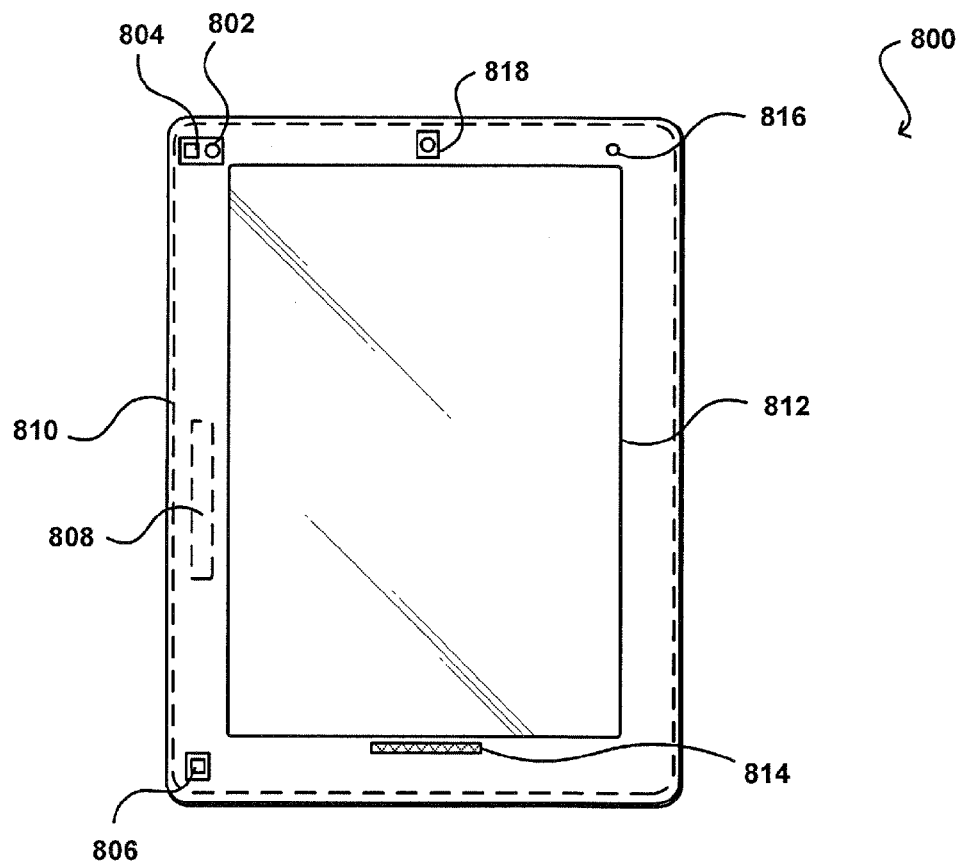
FIG. 8 illustrates an example computing device that can be utilized in accordance with various embodiments.

FIG. 8 illustrates an example of an electronic computing device 800 that can be used in accordance with various embodiments. As discussed, various other types of electronic devices can be used as well within the scope of the various embodiments. This example device includes a display element 812 for displaying information to a user as known in the art. The example device also includes at least one motion-determining element 808, such as an accelerometer or gyro element, which can be used to determine motion of the device, which can help to predict blur or focus of a captured image using various approaches described herein. The device also includes at least one image capture element for capturing image information about the user of the device. The imaging element may include, for example, a camera, a charge-coupled device (CCD), a motion detection sensor, or a radiation sensor, among many other possibilities. The example device in FIG. 8 includes a digital video camera 816 for capturing image information using ambient light as known in the art.

The example device also includes an infrared (IR) emitter 802 and two IR detectors 804, 806 (although a single detector and two emitters could be used as well within the scope of the various embodiments). The IR emitter 802 can be configured to emit IR radiation, and each detector can detect the IR radiation reflected from a user (or other such surface or object). By offsetting the detectors in this example, each detector will detect radiation reflected at different angles.

In the example illustrated in FIG. 8, a first IR detector 804 is positioned substantially adjacent to the IR emitter 802 such that the first IR detector will be able to capture the infrared radiation that is reflected back from a surface, such as a viewer's retinas, in a direction that is substantially orthogonal to the capture plane of the detector. The second IR detector 806 is positioned a distance away from the IR emitter 802 such that the detector will only detect IR radiation reflected at an angle with respect to the orthogonal direction. When imaging a retro-reflector such as a user's retina, the second IR emitter will detect little to no reflected radiation due to the IR emitter, as the retina will not significantly reflect in the direction of the second emitter (although defects, particulates, or variations may deflect some of the radiation). As discussed later herein, this difference among images can be used to determine the position (and other aspects) of the retinas of a user, as the difference in IR reflection between the two images will be significant near the pupils or other such features, but the remainder of the images will be substantially similar.

In an alternative embodiment, a computing device utilizes a pair of IR emitters (e.g., IR light emitting diodes (LEDs), IR laser diodes, or other such components), to illuminate a user's face in a way that is not distracting (or even detectable) to the user, with the reflected light being captured by a single IR sensor. The LEDs are separated a sufficient distance such that the sensor will detect reflected radiation from a pupil when that radiation is emitted from the LED near the sensor, and will not detect reflected radiation from the pupil when that radiation is emitted from the LED positioned away from the sensor. The sensor can capture IR images that enable the device to analyze features of the user that reflect IR light, such as the pupils or teeth of a user. An algorithm can attempt to calculate a position in three-dimensional space (x, y, z) that corresponds to a location equidistant between the user's eyes, for example, and can use this position to track user movement and/or determine head motions. A similar approach can be used that utilizes a single IR emitting diode and a pair of IR sensors, as discussed above. Thus, the device can either direct IR from two locations or detect IR from two locations, with only one of those locations receiving retro-reflected radiation from a user's retinas. Other embodiments can utilize other approaches for performing head tracking, such as by requiring a user to wear glasses that emit IR radiation from a point source, etc.

In some embodiments it can be preferable to utilize a single emitter and two detectors when using single wavelength IR (e.g., 940 nm) in two directions, as using a single camera might be cheaper but also requires that images from the different directions be captured at different times. A downside to capturing images at different times is that movement during that period can affect the determination, even for capture frequencies on the order of 30 Hz (or 15 Hz for two cameras to get the same resolution). An advantage to a multi-camera system is that the images can be captured substantially simultaneously, such that movement between images is minimized. A potential downside to such an approach, however, is that there can be optical variations in the images due to the images being captured from two different points of view.

In one embodiment, a single detector can be used to detect radiation reflected at two different wavelengths. For example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation simultaneously, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest.

The emitter(s) and detector(s), and any ambient light camera(s) or other image capture element(s), can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not shown) positioned on the device that transmit IR at different frequencies. By detecting which frequencies are received by the detectors, the device can determine specific information as to the orientation of the users gaze. Further discussion of using IR light to detect relative eye position can be found in co-pending U.S. patent application Ser. No. 12/786,297, filed May 24, 2010, and entitled "Determining Relative Motion as Input," which is hereby incorporated herein by reference for all purposes.

In some embodiments, it might be useful for a user to participate in a calibration process which accounts for aspects such as the strength of eye reflection from the user, as well as to determine dimensions, calibrate direction determinations, etc. Such an approach also can be useful if a user uses glasses that reduce the reflective capability, etc.

As discussed, other types of input can be provided as well for various purposes. For example, the device can include a touch- and/or pressure-sensitive element 810 around at least a portion of the device 800, such as on the back and/or sides of the device. Using such material, the device is able to determine whether a user is actively holding the device and/or can enable the user to apply input by squeezing at least a portion of the device. The input information could be used to enable the user to trigger a manual authentication, such as to perform a secure unlock of the device. The user can be facing substantially towards the device and squeeze, swipe, or otherwise provide input to a region on the device, at which time the device can determine, through the input, that the user is likely looking at the screen and can use a frame of recently- or subsequently-captured image information to process using a facial recognition or other such algorithm. The device can also determine, through use of the material, which portions of the device are likely covered by the hands of the user. In such an embodiment, multiple cameras and/or IR emitters may be positioned on the device at different locations, and based on where the user is holding the device (i.e., which IR emitters are covered vs. not covered), the system can determine which element(s) to use when capturing images.

The example device in FIG. 8 also includes a separate detection element 916, such as a motion sensor, heat signature detector, or light sensor. Such an element can provide input such as whether there is sufficient lighting for an image to be analyzed, as well as whether there is potentially a person in the room for purposes of activating an image capture or orientation-determining process. Further, a light-detecting sensor can help the device compensate for large adjustments in light or brightness, which can cause a user's pupils to dilate, etc. For example, when a user is operating a device in a dark room and someone turns on the light, the diameters of the user's pupils will change. As with the example above, if the device includes a display element that can operate in different modes, the device may also switch modes based on changes in the user's pupil dilation. In order for the device to not improperly interpret a change in separation between the device and user, the light detecting sensor might cause gaze tracking to be temporarily disabled until the user's eyes settle and a recalibration process is executed. Various other such approaches to compensate for light variations can be used as well within the scope of the various embodiments.

The example device 800 in FIG. 8 is shown to also include a microphone 814 or other such audio-capturing device. In some embodiments, the device can include multiple audio capture elements that can be used to help determine a relative direction or location of an audio source in two or three dimensions. The device in at least some embodiments can also trigger various actions based upon sound detected by the microphone. For example, if the device detects speech from a person, the device might activate video capture to attempt to locate and/or identify the person speaking.

In the example configuration of FIG. 8, each imaging element 804, 806, 816 is on the same general side of the computing device as a display element, such that when a user is viewing the interface in the display element the imaging element has a viewable area that, according to this example, includes the face of the user. While in some embodiments the imaging element is fixed relative to the device, in other embodiments the imaging element can be operable to track the position of the user, such as by rotating the imaging element or an optical element (e.g., a lens, mirror, etc.) that directs light to the imaging element. In some embodiments, the device can include capture elements on the sides, back, or corners of the device, or in any other such location, which can capture image information in any appropriate direction around the device. In some embodiments, a device can concurrently image and identify multiple persons in different locations around the device, and track those persons over time using the various elements.

Figure 9:
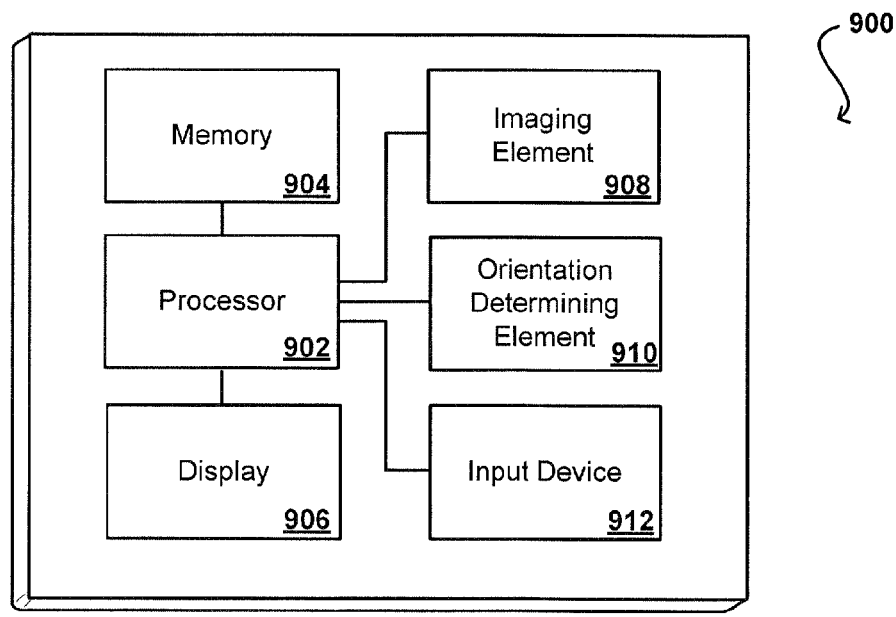
FIG. 9 illustrates example components of a device such as that illustrated in FIG. 8.

FIG. 9 illustrates a set of basic components of an example computing device 900 such as the devices described with respect to FIG. 8. While a portable smart device is depicted in many examples herein, the computing device could be any appropriate device able to receive and process input commands, such as a personal computer, laptop computer, television set top box, cellular phone, PDA, electronic book reading device, video game system, or portable media player, among others. In this example, the device includes a processor 902 for executing instructions that can be stored in a memory device or element 904. As known in the art, the device can include many types of memory, data storage or computer-readable media, such as a first data storage for program instructions for execution by the processor 902, a separate storage for images or data, a removable memory for sharing information with other devices, etc. The device typically will include some type of display element 906, such as a liquid crystal display (LCD), although devices such as portable media players might convey information via other means, such as through audio speakers. As discussed, the device in many embodiments will include at least one imaging element 908 such as a camera, sensor, or detector that is able to image a facial region of a user. The imaging element can include any appropriate technology, such as a CCD imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

In some embodiments, the device can include at least one orientation determining element 910 that is able to assist in selecting an appropriate image as discussed elsewhere herein. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. In some embodiments, the orientation-determining element can determine when the device is moving and is likely to produce a blurry image, and can prevent IR pulsing during this period in order to conserve power since the image information will likely not be useful based at least upon the motion of the device.

The device can include at least one additional input device 912 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information.

In some embodiments, one or more icons or other notifications might be displayed on the device to indicate to the user that IR illumination is active, or that image recognition is being performed. In some embodiments, a light (e.g., LED) on the device might illuminate in order to notify the user that facial recognition is activated in order to signal to the user that the user should look at the device and remain relatively still until the process can complete. Various other notifications can be used as well as appropriate.

A number of other approaches can be used as well within the scope of the various embodiments. For example, thermal imaging or another such approach could be used to attempt to determine and track the position of at least some aspect of a human user. In many instances the imaging system is desired to be small and cheap enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

Other conventional elements can be used to reduce the cost of a computing device able to perform approaches discussed herein, but might be less accurate and/or might require a larger device. For example, images can be split using beam splitters (e.g., silvered mirrors) such that half of the reflected light gets reflected to a different location (e.g., part of a sensor). Similarly, various optical elements such as an optical interferometer can be used to attempt to obtain accurate distance measurements.

Figure 10:
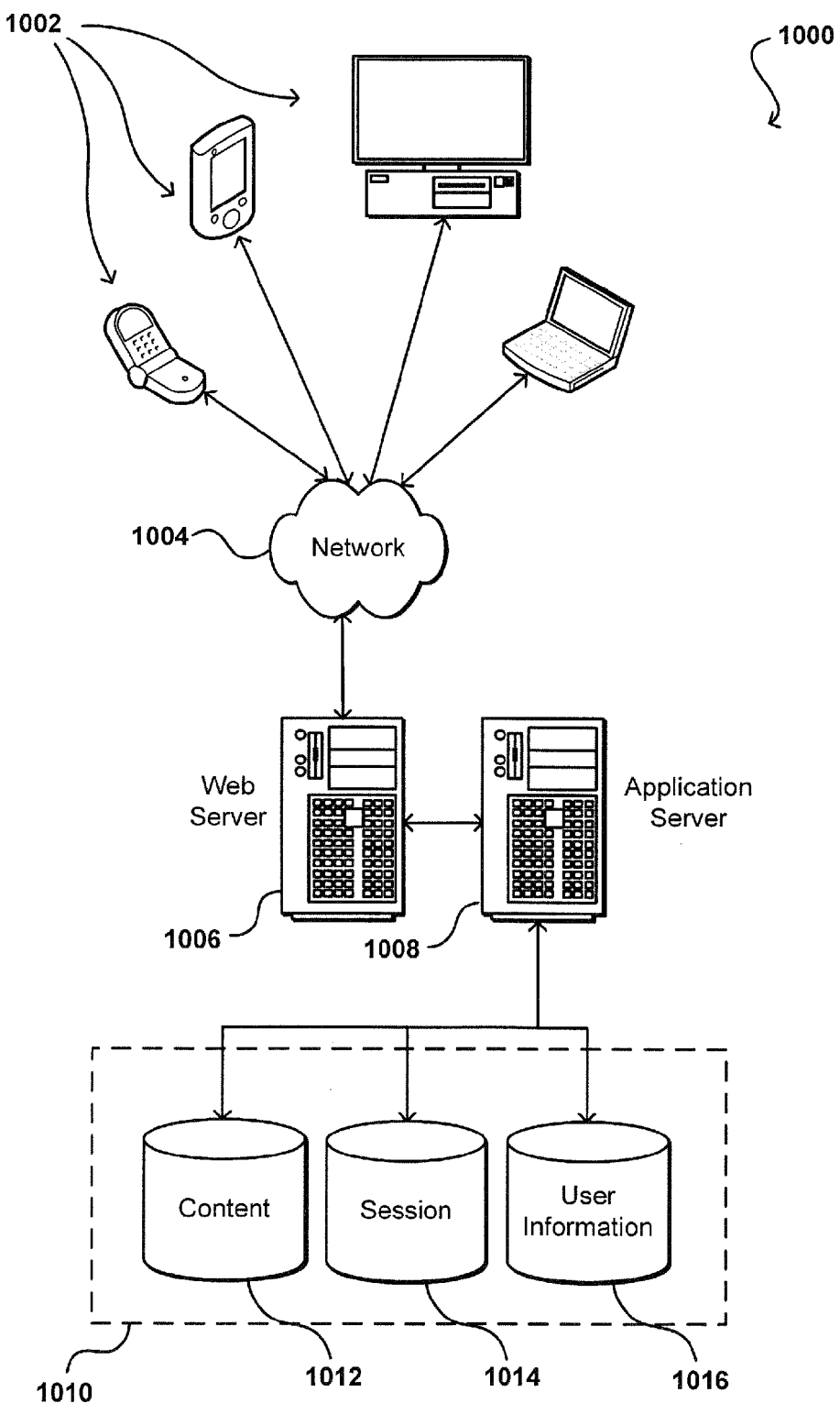
FIG. 10 illustrates an example an environment in which various embodiments can be implemented.

A computing device used for such purposes can operate in any appropriate environment for any appropriate purpose known in the art or subsequently developed. Further, various approaches discussed herein can be implemented in various environments for various applications or uses. Portions of the analysis also can be sent or offloaded to remote devices which might have more available resources and/or capacity. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The environment 1000 shown includes a variety of electronic client devices 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 1004.

The network 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 1006 and a supplemental content provider 1008. Each provider can include at least one Web server 1006 for receiving requests from a user device 1002 and serving content in response thereto, although for other networks an alternative device serving a similar purpose could be used as would be apparent to one of ordinary skill in the art.

Each content provider in this illustrative environment includes at least one application server 1008 or other such server in communication with at least one data store 1012, 1014, 1016. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1002 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. It should be understood that there can be many aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 1002. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of rendering content on a display screen of a computing device, comprising:
   under control of a computing device configured with executable instructions,
   capturing video information using a camera of the computing device;
   detecting at least one first feature in the video information indicative of a head of a user;
   determining a first relative position of the at least one first feature with respect to the computing device;
   rendering the content on the display screen of the computing device to correspond to a viewpoint of the user at the first relative position;
   at a first time, predicting that the at least one first feature will be outside a field of view of the camera at a second time based at least in part upon analyzing the video information;
   storing to a buffer first motion information obtained from at least one sensor of the computing device from the first time to the second time based at least in part upon predicting that the at least one first feature will be outside the field of view of the camera at the second time;
   at the second time, determining that the at least one first feature is outside the field of view of the camera based at least in part upon analyzing the video information;
   estimating a second relative position of the at least one first feature with respect to the computing device based at least in part upon where the at least one first feature was last tracked in the video information with at least a minimum level of confidence and a motion of the computing device determined based at least in part upon the first motion information pulled from the buffer and second motion information obtained from the at least one sensor after the second time;

determining an updated viewpoint of the user based at least in part upon the second relative position; and rendering the content on the display screen to correspond to the updated viewpoint.

2. The computer-implemented method of claim 1, wherein the motion includes at least one of a translation or a rotation of the computing device.

3. The computer-implemented method of claim 1, wherein the motion is a weighted combination that is further based at least in part upon an environmental condition, the environmental condition including at least one of an amount of lighting or a presence of a point light source.

4. The computer-implemented method of claim 1, wherein the at least one sensor includes at least one of an electronic gyroscope, an electronic compass, an inertial sensor, an accelerometer, a shadow sensor, motion detector, a microphone array, or a distance sensor.

5. A computer-implemented method of displaying content, comprising:

under control of one or more computing systems configured with executable instructions, capturing image information using a camera of a computing device;

analyzing the image information to determine a first relative position of a first feature of a user with respect to the computing device;

at a first time, predicting that the first feature of the user will be outside a field of view of the camera at a second time;

buffering first motion information obtained from at least one sensor of the computing device from the first time to the second time;

at the second time, estimating a second relative position of the first feature with respect to the computing device based at least in part upon where the first feature was last tracked in the image information with at least a minimum level of confidence and a motion of the computing device determined based at least in part upon the first motion information and second motion information obtained from the at least one sensor after the second time; and rendering content on a display element of the computing device to correspond to a viewpoint of the user, the viewpoint being determined based at least in part upon the second relative position of the first feature of the user.

6. The computer-implemented method of claim 5, wherein the motion is a weighted combination that is further based at least in part upon an environmental condition.

7. The computer-implemented method of claim 6, wherein the environmental condition includes at least one of an amount of lighting or a presence of a point light source.

8. The computer-implemented method of claim 5, wherein the at least one sensor of the computing device includes at least one of an electronic gyroscope, an electronic compass, an inertial sensor, an accelerometer, a shadow sensor, a motion detector, a microphone array, or a distance sensor.

9. The computer-implemented method of claim 5, wherein the motion of the computing device is determined by analyzing second image information captured by the at least one sensor to determine relative movement of at least one background object or light source with respect to the computing device.

10. The computer-implemented method of claim 5, further comprising:

analyzing the image information with a feature detection algorithm to locate the first feature in the image information; and determining the first relative position of the first feature of the user based at least in part upon a position of the first feature in the image information and the field of view of the camera.

11. The computer-implemented method of claim 5, further comprising:

illuminating the first feature with at least one of visible light or infrared radiation while capturing the image information.

12. The computer-implemented method of claim 5, wherein the at least one sensor further provides contact information indicating whether the user is currently contacting the computing device, the contact information being used to further estimate the second relative position of the first feature of the user.

13. A computing device, comprising:

a processor;

a display screen;

a camera;

a motion sensor; and a memory device including instructions that, upon being executed by the processor, cause the computing device to:

capture image information using the camera;

analyze the image information to determine a first viewpoint of a user with respect to the computing device;

at a first time, predict that a head of the user will be outside a field of view of the camera at a second time;

buffer first motion information obtained from the motion sensor from the first time to the second time;

at the second time, estimate a second viewpoint of the user with respect to the computing device based at least in part upon where the head of the user was last tracked in the image information with at least a minimum level of confidence and a motion of the computing device determined based at least in part upon the first motion information and second motion information obtained from the motion sensor after the second time; and render content on the display screen to correspond to the second viewpoint of the user.

14. The computing device of claim 13, wherein the motion sensor includes at least one of an electronic gyroscope, an electronic compass, an inertial sensor, an accelerometer, a shadow sensor, a motion detector, a microphone array, or a distance sensor.

15. The computing device of claim 13, wherein the instructions, upon being executed to cause the computing device to estimate the second viewpoint of the user, include causing the computing device to:

estimate a relative position of the head of the user with respect to the computing device.

16. A non-transitory computer-readable storage medium storing instructions for rendering content for a user viewpoint, the instructions when executed by a processor of a computing system causing the computing system to:

capture video information using a camera of a computing device;

analyze the video information to determine a first relative viewpoint of a user with respect to the computing device;

at a first time, predict that a head of a user will be outside a field of view of the camera at a second time;

buffer first motion information obtained from at least one motion sensor of the computing device from the first time to the second time;

at the second time, estimate a second relative viewpoint of the user with respect to the computing device based at least in part upon where the head of the user was last tracked in the video information with at least a minimum level of confidence and a motion of the computing device determined based at least in part upon the first motion information and second motion information obtained from the at least one motion sensor after the second time; and render content on a display element of the computing device to correspond to the second relative viewpoint of the user.

17. The non-transitory computer-readable storage medium of claim 16, wherein the instructions, upon being executed, further cause the computing system to:

analyze the video information with a feature detection algorithm to locate the head of the user in the video information; and determine the first relative viewpoint of the user based at least in part upon a position of the head of the user in the video information and the field of view of the camera.

18. The non-transitory computer-readable storage medium of claim 16, wherein the instructions, upon being executed, further cause the computing system to:

illuminate the head of the user with at least one of visible light or infrared radiation while capturing the video information.

19. The non-transitory computer-readable storage medium of claim 16, wherein the instructions, upon being executed, further cause the computing system to:

obtain contact information indicating whether the user is currently contacting the computing system, the contact information being used to further estimate the second relative viewpoint of the user.

* * * * *